United States Patent

Zweifel et al.

[11] Patent Number: 4,863,120
[45] Date of Patent: Sep. 5, 1989

[54] OPTIMAL FLIGHT GUIDANCE FOR AIRCRAFT IN WINDSHEAR

[75] Inventors: Terry L. Zweifel; J. Rene Barrios, both of Phoenix, Ariz.

[73] Assignee: Honeywell Inc., Minneapolis, Minn.

[21] Appl. No.: 198,602

[22] Filed: May 2, 1988

[51] Int. Cl.$^4$ .............................................. B64C 13/16
[52] U.S. Cl. .................................... 244/175; 244/182; 244/76 C; 364/427; 364/433
[58] Field of Search ................... 244/76 R, 76 C, 181, 244/182, 191, 186, 175; 340/966-970, 963; 364/427, 428, 433, 434, 440

[56] References Cited

U.S. PATENT DOCUMENTS

| | | | |
|---|---|---|---|
| 3,927,306 | 12/1975 | Miller | 244/186 |
| 3,994,455 | 11/1976 | Simpson | 244/186 |
| 4,079,905 | 3/1978 | Greene | 340/968 |
| 4,281,383 | 7/1981 | Lebrun | 244/181 |
| 4,347,572 | 8/1982 | Berwick, Jr. et al. | 244/181 |
| 4,589,020 | 5/1986 | Kyrazis | 244/181 |
| 4,591,113 | 5/1986 | Mabey | 244/76 C |
| 4,593,285 | 6/1986 | Miller et al. | 244/76 C |

OTHER PUBLICATIONS

"Windshear Escape", Jul. 6, 1985, Transport Press a div of BPI Ltd.

Primary Examiner—Galen Barefoot
Attorney, Agent, or Firm—Arnold L. Albin

[57] ABSTRACT

An aircraft guidance system for optimizing the flight path of an aircraft in the presence of a windshear maximizes the time the aircraft remains in the air and the distance traveled regardless of the magnitude of the windshear, in the presence of horizontal or vertical windshear components, while effectively minimizing excitation of the aircraft's phugoid mode. A flight path angle is commanded sufficient to clear any obstacle that may be found in the airport vicinity. For longitudinal or horizontal shears, a slightly positive constant flight path angle which is a function of the magnitude of the vertical wind is added to the slightly positive flight path angle command to produce a modified command that compensates for the decrease in flight path angle relative to the ground caused by the vertical wind. The system inhibits exceeding stick shaker angle of attack by reducing the command signal until the actual angle of attack is equal to or less than the stick shaker angle of attack.

13 Claims, 4 Drawing Sheets

OPTIMAL FLIGHT GUIDANCE FOR AIRCRAFT IN WINDSHEAR

This is a continuation of application Ser. No. 920,402, filed Oct. 20, 1986, now abandoned.

BACKGROUND OF THE INVENTION

1. Field of the Invention

The invention relates to aircraft control systems and more particularly to a system for exiting a windshear condition in a manner that maximizes the distance traveled and the time the aircraft remains in the air.

2. Description of the Prior Art

Windshear, encountered on takeoff or landing, can pose a serious threat to the safety of aircraft and has been attributed to several aircraft accidents, including the recent crash of an L-1011 aircraft at Dallas, Tex. on Aug. 2, 1985. Windshear has been defined as a rapidly changing horizontal wind or a steady vertical wind whose effect on the aircraft is to cause large speed or altitude deviations from normal flight. Either as a direct result of loss of airspeed and altitude induced by the windshear or as a result of maneuvers by the human pilot to restore the aircraft to its normal flight path, windshear can cause the aircraft to stall or crash.

Prior art systems have included means for detecting and measuring the magnitude of the windshear and or providing guidance to the human pilot or autopilot which would cause the aircraft to fly at some fixed speed, usually slightly greater than stall speed. The speed commanded was usually a speed known as stick shaker speed, which is approximately 5% greater than stall speed, and is the speed where artificial means are coupled to the control column or stick to cause a vibration and warn the human pilot of impending stall. Stick shaker speed has generally been considered to be the minimum speed for safe flight. Corresponding to stick shaker speed is a stick shaker angle of attack, which is generally considered to be the maximum allowable angle for attack for safe flight of the aircraft.

Since may commercial transport aircraft, general aviation aircraft and military aircraft are equipped with a flight director system whereby pitch command signals may be displayed to the human pilot, the guidance command for a windshear encounter is usually presented as a displacement of the pitch command bar. When the human pilot maneuvers the aircraft in such a manner as to reduce the displacement to a null value, he has assured that the aircraft is at the required pitch angle to satisfy the guidance command. In addition, many aircraft are also equipped with an automatic pilot system which can be coupled to manipulate the elevator control surface of an aircraft in order to respond to a predetermined guidance control law, such as one which might be used to command the aircraft to the optimum flight path in the event of a windshear encounter.

A shortcoming of the prior art is that the command fixed speed or angle of attack may result in causing the aircraft to fly at the minimum safe speed when the magnitude and the duration of the windshear do not in fact require such a maneuver. In addition, a command to fly at the maximum angle of attack can excite the phugoid mode of oscillation, which is a long, poorly damped oscillation of the aircraft involving changes of speed and altitude with a period that may exceed two minutes for a large airplane. Excitation of the phugoid mode can result in loss of control and a crash of the aircraft even after the windshear condition has abated. Consequently, prior art systems could in fact create dangerous situations wherein the aircraft would crash even in the presence of relatively low magnitude shear.

Another prior art scheme is discussed in pending application Ser. No. 834,729, Flight Guidance for Aircraft Windshear, co-invented by one of the present inventors and assigned to the assignee of the present invention. In said application, a command was generated to reduce the aircraft's true airspeed at a rate proportional to the magnitude of the encountered windshear, rather than to a fixed airspeed. This control law effectively minimized the flight path angle change in a shear encounter and provided improved guidance commands, but did not adequately take into account the long term phugoid mode oscillations of the aircraft.

The present invention overcomes the limitations of the prior art by providing a guidance command that effectively minimizes excitation of the phugoid mode, while commanding a flight path angle at a minimum elevation sufficient to clear any obstacles, such as tall buildings or hills that may be found around airports and compensate for downbursts. The invention maximizes the time the aircraft remains in the air and the distance traveled, regardless of the magnitude of the windshear or whether the winds are horizontal, vertical, or a combination of the two.

SUMMARY OF THE INVENTION

The present invention provides guidance commands to a human pilot or automatic pilot system for a windshear encounter so as to optimize the resultant flight path of the aircraft and maximize time in the air and distance traveled. When operating in the presence of a tail windshear, a fixed flight path angle independent of the magnitude of windshear is commanded that minimizes excitation of the aircraft's phugoid oscillatory mode while maintaining adequate clearance of hills and buildings that might be present around the airport. In the presence of a vertical wind component, the effect on the aircraft's flight path angle is computed and added to the fixed flight path angle command. The guidance command is limited in magnitude to preclude commands which would cause the aircraft to exceed the maximum allowable angle of attack.

An angle of attack sensor provides a signal which is combined with a sensed pitch angle to derive a signal corresponding to the actual flight path angle. A command signal corresponding to a fixed flight path angle at a predetermined elevation is combined with a signal corresponding to the effective change in flight path angle due to a vertical windshear component and with the actual flight path angle to derive a pitch command signal. The derived pitch command signal may be applied to control the elevator of the aircraft by means of the autopilot system or to a flight director instrument for control by the human pilot.

DESCRIPTION OF THE PREFERRED EMBODIMENT

Before discussing the preferred embodiments of the apparatus of the present invention, a discussion of the various mathematical relationships and flight path strategies will be provided in order to facilitate an understanding of the preferred embodiments.

The most dangerous types of windshear are the tail windshear and the downburst or microburst. The former is a wind that varies with time and blows in the direction of aircraft motion; the latter is a constant wind that blows toward the ground. The tail windshear tends to reduce the aircraft's true airspeed and thus extracts kinetic energy from the aircraft relative to the air mass. As the true airspeed of the aircraft decreases, a stable aircraft will attempt to regain the lost speed by exchanging potential energy for kinetic energy. The loss of potential energy results in loss of altitude, and if the exchange is not controlled by the human pilot or autopilot, the aircraft may lose sufficient altitude to cause a crash. The inherent natural energy exchange may be reduced by pulling up the nose of the aircraft, thereby increasing the angle of attack and lift, using the elevator control surfaces. However, increased drag will result in more speed loss and if unchecked can cause the aircraft to stall and crash. The angle of attack at which the aircraft will stall is a known value that is a function of the aircraft's flap position. As a result, the pilot is constrained in his control capability to a maximum angle of attack which is necessarily less than stall angle.

Figure 1:
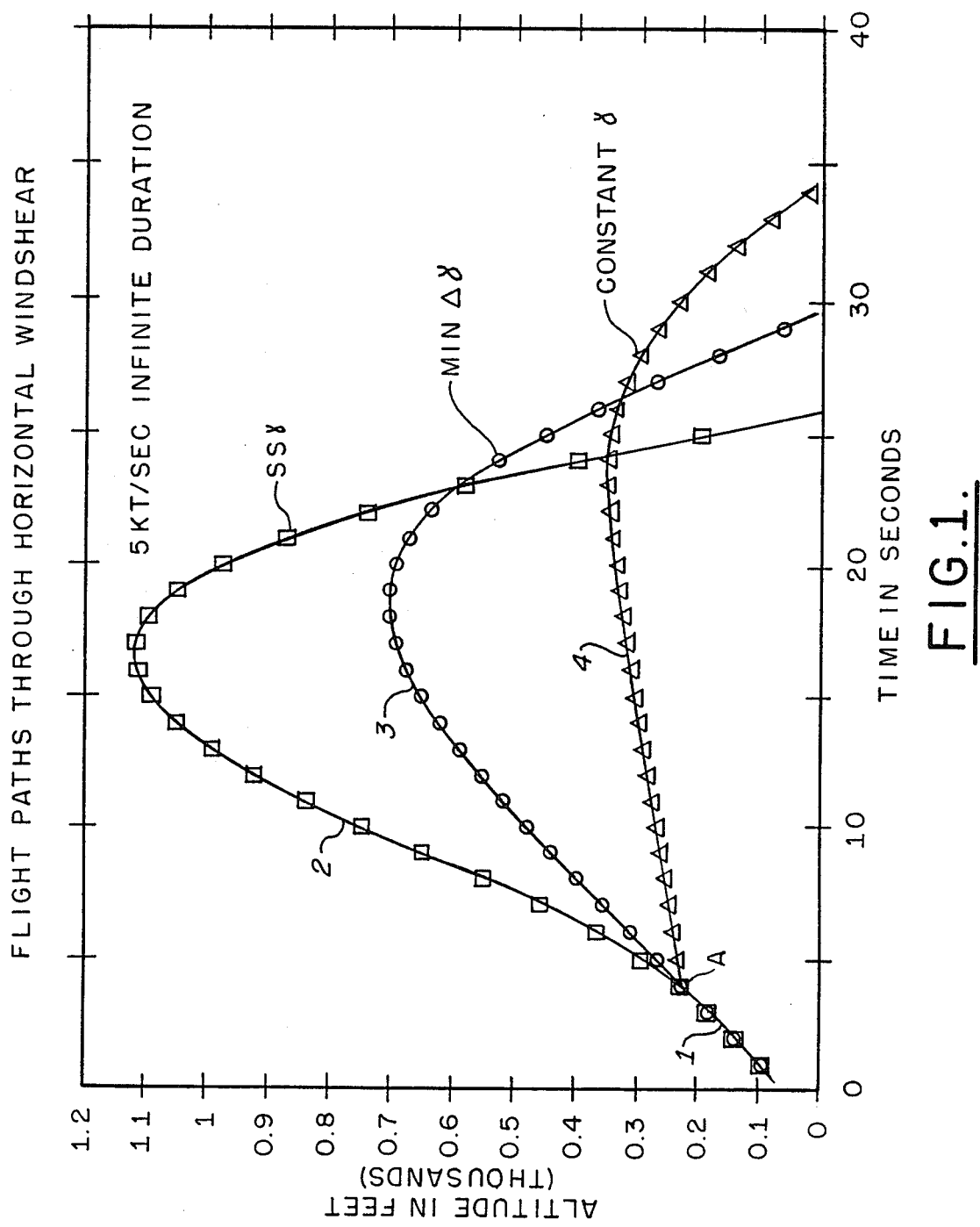
FIG. 1 shows computed values of aircraft altitude vs. time for a horizontal windshear condition with angle of attack as a parameter.

The phugoid oscillatory mode of the aircraft is characterized by flight at an essentially constant angle of attack. During the phugoid oscillations, the exchange of kinetic and potential energy of the aircraft results in airspeed gain and losses accompanied by altitude losses and gains. If the oscillations are of sufficient magnitude, the aircraft may crash during a cycle of oscillation. Characteristically, the phugoid oscillation can be excited when the pilot attempts to maintain stick shaker angle of attack during a tail windshear encounter. FIG. 1 illustrates the flight paths of various guidance schemes in a purely tail windshear of fixed magnitude, 5 knots per second and infinite duration. This magnitude and duration of shear is impossible for the aircraft to safely exit, but does provide a baseline for comparing the efficiencies of various strategies. Line segment 1 corresponds to the flight path of the aircraft before the windshear encounter and is common to all the guidance strategies. At point A, the tail windshear commences. Line segment 2 illustrates the flight path of a strategy that commands attainment and maintenance of stick shaker angle of attack immediately at the onset of shear. It may be seen that initially that the aircraft gains a large amount of altitude, but this is followed immediately by commencement of the phugoid oscillation which results in the aircraft descending towards the ground and crashing at about elapsed time of 26 seconds. When phugoid oscillation has been initiated, the human pilot or automatic pilot is virtually helpless. The angle of attack cannot be increased to develop more lift since the aircraft will stall; conversely pushing the aircraft nose down will simply result in an increased rate of descent.

Further, it is clear that increasing the angle of attack to stick shaker should only be done when absolutely necessary to preclude striking the ground.

From the above, it may be seen that an optimal guidance law for use by the human pilot or an automatic pilot system must provide the best possible utilization of the aircraft's available energy to maintain flight for as long as possible while also minimizing excitation of the phugoid mode of oscillation.

Line segment 3 of FIG. 1 illustrates the flight path of a strategy which attempts to minimize the flight path angle change during a windshear encounter. This strategy is similar in nature to said application Ser. No. 834,729. The strategy tends to prolong the time before it is necessary to reach stick shaker angle of attack and thus delays excitation of the phugoid mode and consequently lengthens the time before impact with the ground. It may be seen from FIG. 1 that this strategy provides a time to impact of 29 seconds, which is clearly superior to the previous strategy of stick shaker angle of attack.

It is well known that a method of minimizing excitation of the phugoid mode is either to minimize the altitude change or speed change resulting from the oscillation. As minimizing the speed change can result in negative flight path angles relative to the ground, in practice the minimization can only be done by minimizing the altitude change. Ideally, this could be done by flying the aircraft at zero flight path angle. In practice, however, when a windshear is encountered at very low altitudes, such as in takeoff or landing, flying zero flight path angle (i.e., flying at constant altitude) could result in the aircraft striking tall buildings or hills near the airport. Hence it is desirable to have a slight positive flight path angle to avoid obstacles on the ground. Federal Aviation Administration regulations state that the minimum allowable flight path angle for multi-engine passenger-carrying jet aircraft is 1.55 degrees. This represents a positive flight path angle for obstacle clearance which also will maximize phugoid damping. Hence, the present invention commands a flight path angle of 1.55 degrees in the event of a horizontal windshear encounter and assures obstacle clearances capability while preventing excitation of the phugoid mode by delaying attainment of stick angle of attack as long as possible.

Line segment 4 illustrates the flight path produced by the present invention where a constant flight path angle of 1.55 degrees is commanded upon an encounter with a purely longitudinal or horizontal windshear. This strategy provides the greatest time to impact of the three strategies previously discussed, resulting in 34 seconds to impact. Further, it may be noted that the rate at which the ground is struck, represented by the slope of the flight path angle lines just prior to ground impact, is the smallest for constant $\gamma$, thus giving the aircraft and occupants a better chance of surviving the crash. The present invention accomplishes this by commanding a slightly positive path angle and thereby maximizing the time before the aircraft must achieve stick shaker angle of attack to remain aloft.

Figure 2:
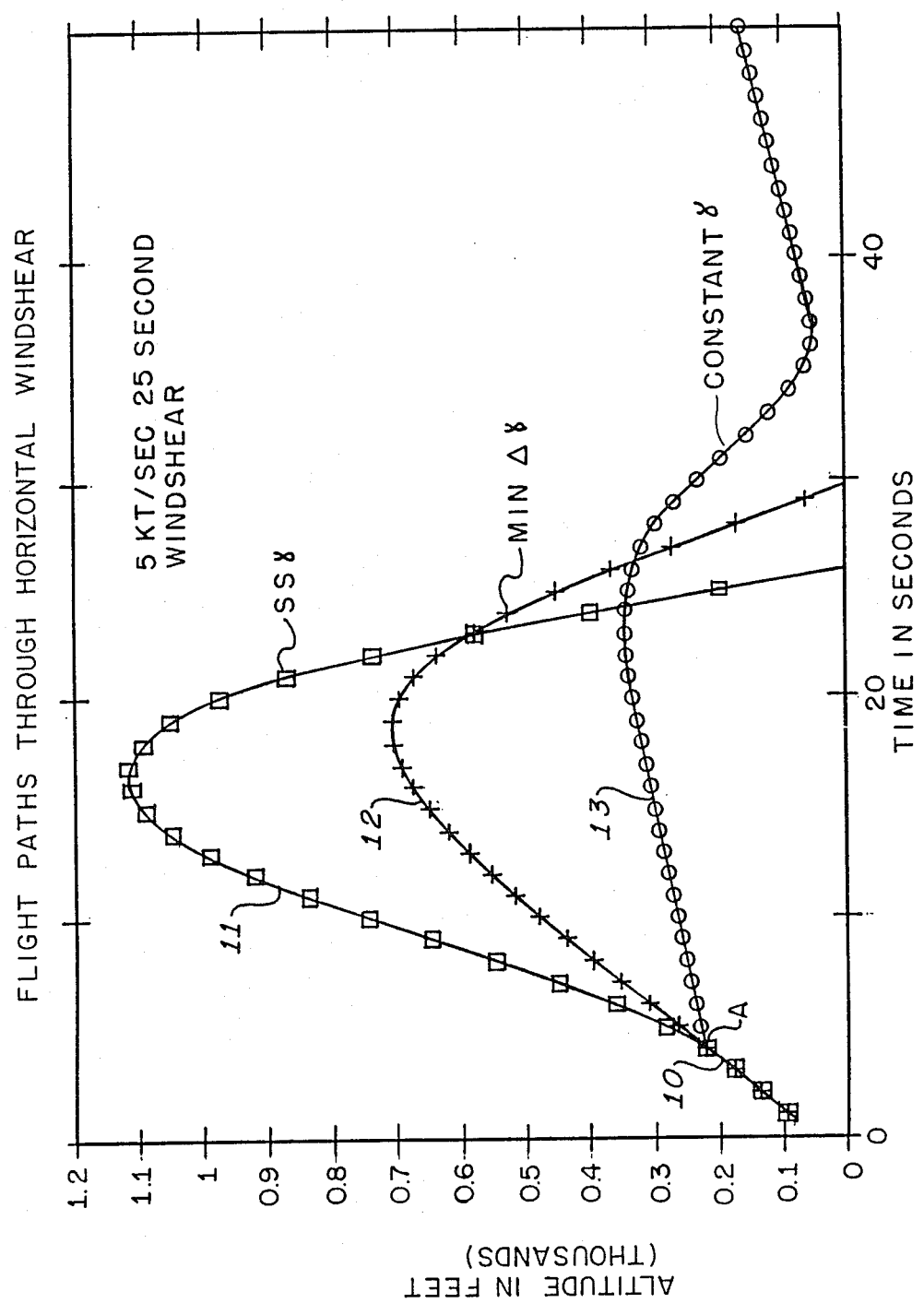
FIG. 2 is a graph illustrative of prior art schemes and the present invention with respect to flight path as a function of angle of attack for a windshear of fixed magnitude and duration.

Referring now to FIG. 2, the encountered windshear is at a fixed magnitude of 5 knots per second and fixed duration of 25 seconds. Line segment 10 represents the flight path of the aircraft before the windshear encounter at point A. The windshear begins at point A and continues for 25 seconds thereafter. Line segment 11 represents the flight path for a strategy of attaining and maintaining stick shaker angle of attack. Line segment 12 represents the strategy of minimizing the flight path angle loss. Line segment 13 represents the flight path produced by the present invention where it is attempted to maintain a positive flight path angle with respect to the ground of 1.55 degrees. It may be seen that the present invention produces the only flight path of those considered capable of exiting the windshear without a crash.

The effect of a downward flowing vertical wind must also be considered. The effect is to reduce the aircraft's flight path angle relative to the ground. A negative flight path angle will result in descent of the aircraft and, if uncorrected, contact with the ground. The flight path angle due to a purely vertical wind may be calculated according to the following well known approximate equation:

$$\gamma_G = \frac{\dot{h}_{AIR} + \dot{h}_{WIND}}{v} \quad (1)$$

$\gamma_G$ = flight path angle relative to the ground in radians
$\dot{h}_{AIR}$ = the aircraft's rate of climb relative to the airmass in feet feet per second
$\dot{h}_{WIND}$ = the vertical velocity of the wind in feet per second, downward being negative
v = the aircraft's speed in feet per second From the above equation it may be seen that the greater the magnitude of the vertical wind, the greater the influence on the aircraft's flight path angle relative to the ground. Hence, a further function of an optimal automatic guidance law would be to account for the reduction in flight path angle relative to the ground due to a vertical windshear. A strategy which attempts to correct for the change in flight path angle requires increasing the lift of the aircraft by increasing the angle of attack through the aircraft's elevator control. If the vertical wind is of sufficient magnitude and duration, the angle of attack will be continually increased until the maximum allowable limit, stick shaker angle of attack, is obtained. As discussed previously, this may result in phugoid mode oscillations. Consequently, it is desirable as it was in the case of purely horizontal or longitudinal windshears to maximize the time before stick shaker angle of attack is reached. In the present invention this is accomplished by computing the neat change in flight path angle due to the vertical wind and altering the constant flight path angle command of 1.55 degrees accordingly.

As an example, assume an aircraft flying at 150 knots and climbing at 10 feet per second in a downward vertical wind of 25 feet per second. The flight path angle relative to the air mass may be computed by the following well known approximate equation:

$$\gamma_A = \frac{\dot{h}_{AIR}}{v} \quad (2)$$

Where:
$\gamma_A$ = the aircraft's flight path angle relative to the air mass in radians.
$\dot{h}_{AIR}$ = the aircraft's vertical velocity relative to the air mass in feet per second.
v = the aircraft's true airspeed in feet per second.

In the example given, a speed of 150 knots is equivalent to 253.35 feet per second. Therefore, $\gamma_A = 0.039$ radians or 2.26 degrees. From equation (1), the flight path angle relative to the ground is equal to $-0.059$ radians or $-3.39$ degrees. From an initial altitude above the ground of 100 feet, the aircraft would strike the ground in approximately 6.6 seconds at a flight path angle of $-3.39$ degrees.

It may be seen by taking the difference of equations (1) and (2) that the net change in flight path angle between air mass and ground references is given by:

$$\Delta\gamma = \frac{\dot{h}_{WIND}}{v} \quad (3)$$

Where:
$\Delta\gamma$ = the difference between air mass and ground flight angles in radians.
$\dot{h}_{WIND}$ = the magnitude of the vertical wind in feet per second.
v = the velocity of the aircraft in feet per second.

From equation (3), the computed difference for the example above would be $-0.0987$ radians or $-5.65$ degrees.

Thus, consideration of the longitudinal or horizontal windshear and the vertical windshear components requires adding 5.65 degrees to the constant value of 1.55 degrees for a new commanded flight path angle of 7.21 degrees. Flying this modified flight path angle relative to the air mass would then assure flying 1.55 degrees relative to the ground while also providing the maximum time available before the aircraft achieves stick shaker angle of attack and therefore minimize the excitation of the phugoid mode oscillations.

Figure 3:
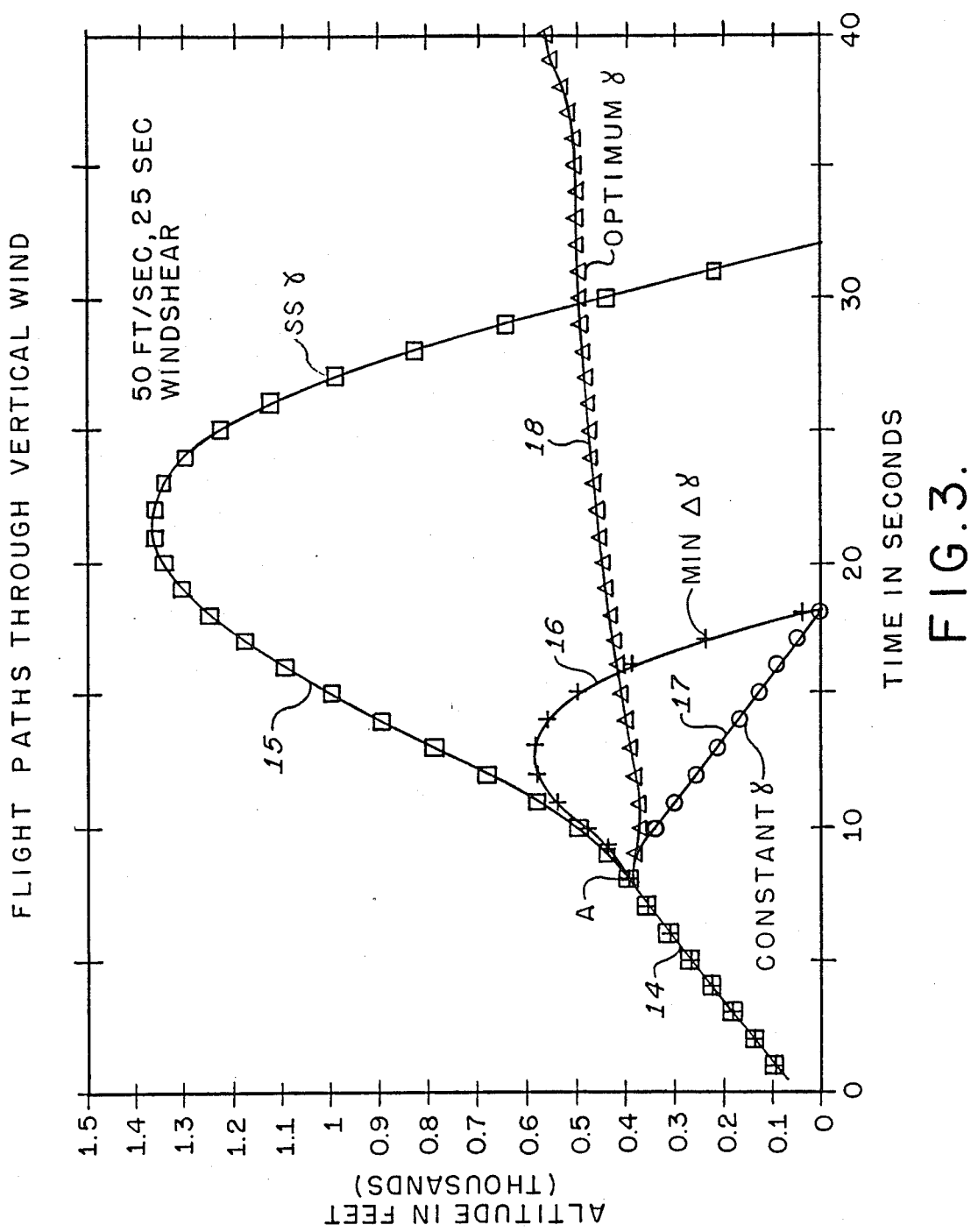
FIG. 3 is a graph illustrative of the flight path commanded by the present invention compared to prior art schemes in the presence of a vertical windshear.

Referring now to FIG. 3. flight paths of an aircraft using various flight path strategies are compared when flying through a vertical windshear of 50 feet per second and 25 seconds duration. Line segment 14 represents the flight path of the aircraft before encountering the vertical wind. The windshear condition begins at point A and persists for a duration of 25 seconds thereafter. Line segment 15 represents the flight path of the aircraft while maintaining stick shaker angle of attack. Line segment 16 represents the flight path while minimizing flight path angle loss. Line segment 17 represents the flight path produced by flying a constant flight path of 1.55 degrees relative to the air. Line segment 18 is a representation of the flight path produced by the present invention, wherein the commanded flight path of 1.55 degrees is augmented by the change in flight path angle caused by the vertical wind. FIG. 3 clearly shows the superiority of the present invention over the other considered flight path strategies.

Figure 4:
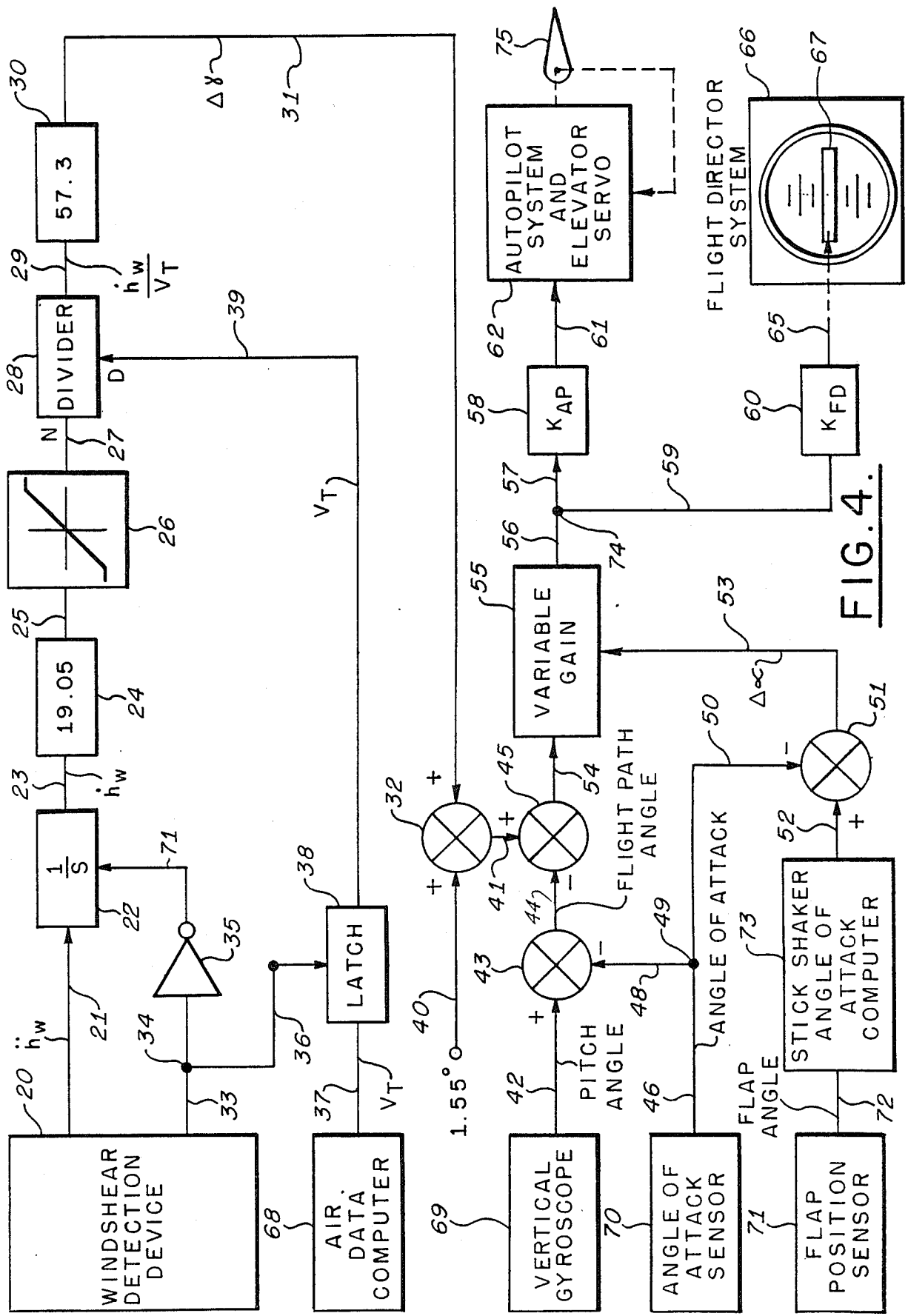
FIG. 4 is a schematic block diagram of the present invention.

FIG. 4 is a block diagram of the present invention which provides an optimum guidance signal for exiting a windshear. For clarity and understanding of the present invention it will be explained by using a generally analog format, it being understood that the same analog format may also represent the programming of a programming digital computer wherein the various analog inputs are converted to digital signals for digital processing and the various digital outputs are converted to analog signals for driving either a flight director indicator or automatic pilot system.

In operation windshear detection device 20 supplies a signal $\dot{h}_{\dot{W}}$ on lead 21 that is proportional to the magnitude and has the same sign as the time rate of change of vertical wind measured in units of the gravitational constant or g's. The windshear detection device may be that as described in U.S. Pat. No. 4,593,285 filed May 6, 1983 and issued June 3, 1986 to the present assignee.

The detector disclosed therein is capable of supplying a signal proportional to the rate of change of vertical wind and a logic signal indicating when a predetermined threshold denoting a serious or minor windshear condition has been detected.

Lead 21 supplies the signal $\dot{h}_W$ to conventional integrator 22 whose function is to provide an output $h_W$ on lead 23 that is proportional to the time integral of the input signal appearing on lead 21. The signal $\dot{h}_W$ represents the vertical velocity of the wind in g-seconds. Windshear detection device 20 provides a logic signal via lead 33, junction 34 and inverter 35 which is a logical 1 on lead 71 whenever a windshear has not been detected and a logical 0 whenever a windshear has been detected. A logical 0 on lead 71 enables the integrator 22. A logical 1 applied to integrator 22 results in a 0 output, that is the integrator is reset. Consequently, the signal appearing on lead 23 is proportional to the magnitude of the vertical wind and has units of g-seconds whenever a windshear exceeding the predetermined threshold of detection occurs; otherwise the signal appearing at lead 23 will be at null.

Lead 23 is coupled to conventional gain element 24. Gain 24 multiplies the signal on lead 23 by a value of 19.05. Multiplication by 19.05 converts the units of the signal on lead 23 from g-seconds into knots. The output of gain 24 appears on lead 25 and is supplied to limiter 26.

Limiter 26 is used to preclude drift and dc offset of integrator 22 from presenting a runaway condition in the presence of a windshear. Limiter 26 acts to limit the magnitude of the signal appearing on lead 25 between predetermined values, as for example, +100 knots and −100 knots. Thus, a signal exceeding 100 knots is limited to a value of 100 knots and a signal less than −100 knots is set set equal to −100 knots. The resultant limited signal is outputted on lead 27. Values of the signal on lead 25 falling between the predetermined limit values appear unchanged on lead 27.

Lead 27 supplies a conventional divider 28 with a value to be used as the numerator (N) of the quotient. The denominator (D) is supplied by lead 39 and is a signal proportional to the true airspeed of the aircraft at the time that the windshear is initially encountered.

The signal $V_T$ on lead 39 is derived as follows. Conventional air data computer 68 provides a signal $V_T$ proportional to the true airspeed of the aircraft, measured in knots, to conventional latch 38 via lead 37. Latch 38 operates in such a fashion as to store the value present on lead 37 when a logical high signal, denoting the presence of a windshear, appears on lead 36. The signal on lead 36 is supplied by windshear detection device 20 via lead 33 and junction 34. Thus, whenever a windshear is detected, having either horizontal or vertical components, latch 38 stores the value of true air speed at the time and supplies the value as a continuous output on lead 39 to divider 28. If the signal on lead 36 is a logical null, indicating the absence of windshear, the instantaneous airspeed signal appears on lead 39 unaltered. Lead 36 also provides a corresponding logic signal on lead 74 to variable gain 55, whose function will be described.

The purpose of storing and utilizing the true airspeed existing at the time of the initial windshear encounter is to provide a constant reference for divider 28. Thus, in the event of both a tail windshear and a vertical wind, the continuous reduction in air speed due to the tail windshear could result in a flight path angle correction greater than required and could drive the aircraft to stick shaker angle of attack sooner than necessary to obtain the desired flight path correction. By latching and utilizing the air speed at the time of windshear detection, this anomaly is overcome and the optimum flight path angle increment is computed.

The output of divider 28 appears on lead 29 and is a signal $h_w/V_T$, representing the quotient of the magnitude of the vertical wind divided by the latched air speed. This signal is the term $\Delta \gamma$ of equation (3) in units of radians. The signal on lead 29 is applied to conventional gain 30 which multiplies the signal on lead 29 by a value of 57.3 to convert radians to degrees. Thus the output of gain 30, appearing on lead 31, represents the incremental flight path angle due to a vertical windshear measured in degrees.

A signal having a predetermined value corresponding to 1.55 degrees, but which may be any other suitable constant angular value, is impressed on lead 40 and applied to conventional summing junction 32. The incremental flight path angle signal on lead 31 is also applied to summing junction 32 where the signals are algebraically added to provide an output signal 41. The signal on lead 41 therefore represents the desired flight path angle of 1.55 degrees for horizontal or longitudinal shears augmented by the incremental flight path angle computed from the magnitude of the vertical wind.

Since it is desired to command a change in the actual flight path angle to correct for the windshear, the actual flight path angle must first be determined. Conventional vertical gyroscope 69 furnishes a signal proportional to the pitch attitude of the aircraft, measured in degrees, on lead 42. A signal proportional to the actual angle of attack of the aircraft, measured in degrees, is supplied by sensor 70 on lead 46 to junction 49, lead 48, and lead 50. The signals on lead 42 and 48 are applied to summing junction 43 which operates in such a manner as to produce the algebraic difference thereof representative of flight path angle, on lead 44. Lead 44 supplies the actual flight angle of the aircraft to summing junction 45. As previously described, summing junction 32 provides a signal on lead 41 representing the desired or commanded flight path angle for the aircraft in a windshear encounter to junction 45. Junction 45 provides an output on lead 54 that is the algebraic difference between the desired flight path angle and the actual flight path angle and is thus a signal representative of an error command for correcting the vertical flight path due to a windshear.

Summation device 51 is supplied with a signal representative of the actual angle of attack of the aircraft, measured in degrees, via lead 46, junction 49 and lead 50. Flap position sensor 71 supplies a signal proportional to angular position of the aircraft flaps on lead 72 to stick shaker angle of attack computer 73. Computer 73 provides predetermined values of stick shaker angles of attack corresponding to each flap position. This signal appears on lead 52 which is applied to summing junction 51. Junction 51 produces an algebraic difference between the stick shaker angle of attack on lead 52 and the actual angle of attack on lead 50. The difference, $\Delta \alpha$, is applied on lead 53 to variable gain 55. Thus, the signal on lead 53 is a comparison of the actual angle of attack with stick shaker angle of attack. When the two signals are identical the signal on lead 53 will be null. If the two signals differ by degrees, the signal on lead 53 will correspond to 5 degrees.

When the value on lead 53 is negative, indicating the actual angle of attack exceeds the stick shaker angle of attack, the output appearing on lead 56 will be identical to the signal on lead 53. Since this signal has a negative sign it results in an ultimate command to decrease the angle of attack back to the stick shaker value. When the difference signal on line 53 is less than a predetermined value, for example 3 degrees, the output on lead 56 will be the value of the signal on lead 54 multiplied by a computed factor. The value of the computed factor is dependent on the value of the signal appearing on lead 53, the difference between stick shaker angle of attack and actual angle of attack. When the difference between the two signals exceeds the predetermined value, the gain factor is a constant, for example 1.0. For values less than the predetermined value, the multiplier is a direct function of the magnitude of the lead signal appearing on lead 53. For example if the signal on lead 53 is 2°, the multiplier value would be 0.67; if the signal on lead 53 is 1°, the value of the multiplier would be 0.33; and if the signal on lead 53 is of null value, the multiplier will be zero.

Through the above described action, gain 55 serves the function of precluding guidance commands that would exceed the stick shaker angle of attack of the aircraft. At actual angles of attack less than the stick shaker angle of attack, for example 3° or greater, the signal on lead 54, which represents the commanded flight path direction error signal, would be output on lead 56 unchanged. As the angle of attack approaches sub-stick shaker angle of attack, the multiplication factor is reduced and hence the signal on lead 56 would be less than that on lead 54. When the actual angle of attack is equal to the stick shaker angle of attack, the signal on lead 56 is a null resulting in a zero command and hence no change in angle of attack would be commanded.

The signal on lead 56 is ultimately coupled at junction 74 to produce an angle of attack command to the autopilot system or the flight director system. Lead 56 supplies gain block 58 via junction 74 and lead 57. Gain 58 multiplies the signal on lead 57 by an appropriate constant gain $K_{AP}$ that is determined by the characteristics of the autopilot system 62. The output of gain 58 appears on lead 61 and is coupled to a conventional autopilot system and elevator servo 62. The servo output is coupled to the elevator 75 in a conventional manner. Elevator control surface will either cause an increase or decrease in angle of attack and pitch angle which is sensed by a feedback control system, until the signal on lead 61 is a null. When the signal on lead 61 is null, the guidance control has been satisfied and the aircraft is on the correct flight path.

In a similar fashion a command signal is supplied to the flight director system 66. The output of variable gain 55 appears on lead 56 and is coupled at junction 74 to lead 59. Lead 59 supplies a conventional gain 60. Conventional gain 60 multiplies the signal on lead 59 by an appropriate factor $K_{FD}$ for energizing the flight director system 66. The output of gain 60 appears on lead 65 and is coupled through conventional electronic or mechanical means to a pitch command bar 67. The human pilot observes the position of the pitch command bar and changes the angle of attack and pitch angle of the aircraft in the direction indicated by the command bar movement until the signal on lead 65 is null, so that the pitch command bar 67 is returned to its null position, whereupon the guidance control has been satisfied and the aircraft is on the correct flight path.

It will be appreciated from the foregoing discussion that in a windshear encounter a fixed predetermined flight path angle of 1.55° is commanded in the event of a longitudinal or horizontal windshear. The commanded angle is altered as a function of the magnitude of a vertical windshear to produce a resultant 1.55 flight path angle relative to the ground. An error command produced by subtracting the actual flight path angle from the commanded flight path angle is modified as a function of the difference between stick shaker angle of attack and actual angle of attack. Exceeding stick shaker angle of attack will result in commanding a reduction in angle of attack. The combination of the above functions serves to produce a guidance command that results in an optimal flight path angle for windshear encounters.

While the invention has been described in its preferred embodiments, it is to be understood that the words which have been used are words of description rather than limitations and that changes may be made within the purview of the appended claims without departing from the true scope and spirit of the invention in its broader aspects.

We claim:

1. Apparatus for controlling the longitudinal flight path of an aircraft encountering a windshear condition, comprising:
   means for providing a signal representative of an actual flight path angle,
   means for providing a signal representative of a substantially constant predetermined flight path angle, said signal substantially independent of the aircraft flight characteristics,
   means for providing a signal representative of a change in flight path angle due to detection of a vertical windshear rate component,
   means for combining said predetermined flight path angle signal and said change in flight path angle signal to provide an algebraic sum thereof, and
   means for subtracting said acutal flight path angle signal from said combined signals to derive a signal representative of an error command signal so that said actual flight angle is urged to substantial coincidence with said predetermined flight path angle.

2. The apparatus as set forth in claim 1, further comprising:
   means responsive to said error command signal for controlling the pitch of said aircraft in accordance therewith.

3. The apparatus as set forth in claim 2, wherein sid signal representative of a change in flight path angle due to a windshear component comprises:
   means for providing a signal representative of airspeed of the aircraft with respect to an air mass,
   means for providing a signal corresponding to the vertical wind velocity due to winshear,
   means responsive to said vertical wind velocity signal and said airspeed signal for providing a signal corresponding to the quotient thereof, and
   means responsive to the detection of said vertical windshear rate component for storing and utilizing the airspeed at the time of an initial windshear encounter.

4. The apparatus as set forth in claim 3, further comprising:
   means for detecting the presence of said windshear condition exceeding a predetermined threshold and for providing a signal corresponding thereto, and means responsive to said airspeed signal and said windshear detection signal to provide a predetermined airspeed signal corresponding to the true airspeed upon activation of said detection signal.

5. The apparatus as set forth in claim 4, further comprising:
means for providing a signal representative of stick shaker angle of attack,
means for providing a signal representative of actual angle of attack,
means for combining said signal representative of stick shaker angle of attack and said signal representative of actual angle of attack to provide a resultant signal corresponding to any difference therebetween, and
limiter means responsive to said error command signal and to said difference signal for providing a pitch command signal bounded by predetermined limits such that said limited pitch command signal has a zero value when an actual angle of of attack is at least equal to said stick shaker angle of attack; said limited pitch command signal results in a pitch down command when said stick shaker angle of attack is exceeded by an actual angle of attack; and said pitch command signal results in a pitch up command corresponding to said error command signal when said stick shaker angle of attack exceeds said actual angle of attack, said pitch up command bounded by said predetermined limits when said difference signal exceeds a predetermined value.

6. The apparatus as set forth in claim 5, wherein said means for controlling the pitch of said aircraft comprises:
means for applying said limited command signal to displace the pitch command bar of a flight detector instrument proportional to the magnitude and sense of said signal.

7. The apparatus as set forth in claim 5, wherein said means for controlling the pitch of said aircraft comprises:
an automatic flight command system coupled to an elevator of said aircraft and responsive to said limited command signal, thereby to produce movement of said elevator proportional to the magnitude and sense of said signal.

8. The apparatus as set forth in claim 7, wherein said predetermined flight path angle is 1.55°.

9. A method for controlling the flight path of an aircraft encountering a windshear condition, comprising the steps of:
providing a control system for commanding a change of pitch attitude of the aircraft,
controlling pitch attitude to maintain a predetermined minimum flight path angle irrespective of changes in airspeed due to windshear,
controlling pitch attitude in accordance with an actual flight path angle,
controlling pitch attitude in accordance with differences of stick shaker angle of attack and an actual angle of attack,
varying said pitch attitude so as to provide said predetermined minimum flight path angle when said differences exceed a predetermined value and so that a reduced change in pitch attitude is commanded when said differences are less than said predetermined value, and
further commanding a null change in pitch attitude when said actual angle of attack is equal to a value of stick shaker angle of attack.

10. The method as set forth in claim 9, wherein the step of maintaining a minimum flight path angle further comprises the steps of:
detecting a windshear acceleration and providing a given true airspeed corresponding to the time of detection,
converting said acceleration to a rate component,
providing a quotient of said rate component and said given true airspeed to derive a change in flight path angle, and
combining said derived flight path angle with a predetermined minimum flight path angle to derive a sum thereof.

11. The method as set forth in claim 10, wherein the step of controlling in accordance with an actual flight path angle further comprises the steps of:
providing a signal corresponding to pitch attitude of the aircraft,
providing a signal corresponding to actual angle of attack of the aircraft,
combining said pitch attitude and actual angle of attack signals to form an algebraic difference thereof, and
combining said algebraic difference of angles with said sum of angles to form a pitch command signal therefrom.

12. The method as set forth in claim 11, wherein the step of controlling in accordance with a difference of stick shaker angle of attack and actual angle of attack further comprises the steps of:
providing a signal corresponding to stick shaker angle of attack at a given flap angle,
combining said stick shaker sized with said actual angle of attack signal to form a further algebraic difference, and
applying said further algebraic difference signal to said pitch command signal to control the magnitude thereof.

13. The method as set forth in claim 12, wherein said step of controlling the magnitude of said pitch command signal further comprises the steps of:
applying said pitch command signal to a variable gain,
controlling said variable gain in accordance with predetermined gain values corresponding to values of said further algebraic difference, so that a first predetermined gain of at least unity is achieved when said stick shaker angle of attack is greater than a first value of actual angle of attack, a second predetermined gain less than unity is achieved when said stick shaker angle of attack is greater than a second value of actual angle of attack, and a gain of null is achieved when said stick shaker angle of attack is equal to or less than said actual angle of attack, and wherein the difference between said sticker shaker angle of attack and said actual angle of attack is greater for said first angle of attack than for said second angle of attack.

* * * * *